US008150852B2

(12) United States Patent (10) Patent No.: US 8,150,852 B2
Komatsu et al. (45) Date of Patent: Apr. 3, 2012

(54) CONVERTER, SERVER SYSTEM, CONVERSION METHOD AND PROGRAM

(75) Inventors: Hideaki Komatsu, Yokohama (JP); Moriyoshi Ohara, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/403,443

(22) Filed: Mar. 13, 2009

(65) Prior Publication Data

US 2009/0235257 A1 Sep. 17, 2009

(30) Foreign Application Priority Data

Mar. 14, 2008 (JP) .................................. 2008-66695

(51) Int. Cl.
 *G06F 17/30* (2006.01)
(52) U.S. Cl. ....................................................... 707/737
(58) Field of Classification Search .................. 707/737, 707/713, 3, 999.003
 See application file for complete search history.

(56) References Cited

U.S. PATENT DOCUMENTS

| 5,878,056 | A  | * | 3/1999  | Black et al. ................... 714/748 |
| 6,507,834 | B1 | * | 1/2003  | Kabra et al. ................... 707/718 |
| 6,601,064 | B1 | * | 7/2003  | Nag et al. .............................. 1/1 |
| 6,799,166 | B2 | * | 9/2004  | Dorrance et al. ............... 705/35 |
| 7,310,638 | B1 | * | 12/2007 | Blair ....................................... 1/1 |
| 7,661,103 | B2 | * | 2/2010  | Hayward ...................... 717/178 |
| 2001/0010055 | A1 | * | 7/2001 | Hirabayashi .................. 709/201 |
| 2002/0078117 | A1 | * | 6/2002 | Wang Baldonado et al. . 709/101 |
| 2005/0165802 | A1 | * | 7/2005 | Sethi et al. ..................... 707/100 |
| 2005/0251533 | A1 | * | 11/2005 | Harken et al. ............. 707/104.1 |
| 2005/0256892 | A1 | * | 11/2005 | Harken ........................... 707/101 |
| 2007/0220516 | A1 | * | 9/2007 | Ishiguro et al. ............... 718/101 |
| 2008/0163219 | A1 | * | 7/2008 | Marwinski .................... 718/101 |
| 2009/0157596 | A1 | * | 6/2009 | Couch et al. ....................... 707/1 |
| 2009/0248754 | A1 | * | 10/2009 | Lipton et al. .................. 707/202 |

OTHER PUBLICATIONS

Harizopoulos, et al., "Improving Instruction Cache Performance in OLTP", ACM Transactions on Database Systems, vol. 31, No. 3, Sep. 2006, pp. 887-920.

"Development of System Architecture and Middleware Product . . . ", NEC Corporation, official website, Sep. 26, 2007, Internet URL: <http://www.nec.co.jp/press/ja/0709/2601.html.

\* cited by examiner

*Primary Examiner* — Kimberly Lovel
*Assistant Examiner* — Mohammed R Uddin
(74) *Attorney, Agent, or Firm* — Vazken Alexanian

(57) ABSTRACT

A converter for converting an application program that is executed for every job request into a batch processing program for collectively processing a plurality of job requests. The converter includes: a code identifier for identifying a portion of the application program that includes a service request to another server, and a portion that does not include a service request; an integration unit for converting the service request into a collective service request that collectively issues a plurality of service requests corresponding to the plurality of job requests; a multiplexing unit for converting the processing code in the application program into a multiplexed code for executing multiple processings corresponding to the plurality of job requests; and an output unit for outputting, as the batch processing program, the application program that the integration unit and the multiplexing unit have processed.

18 Claims, 10 Drawing Sheets

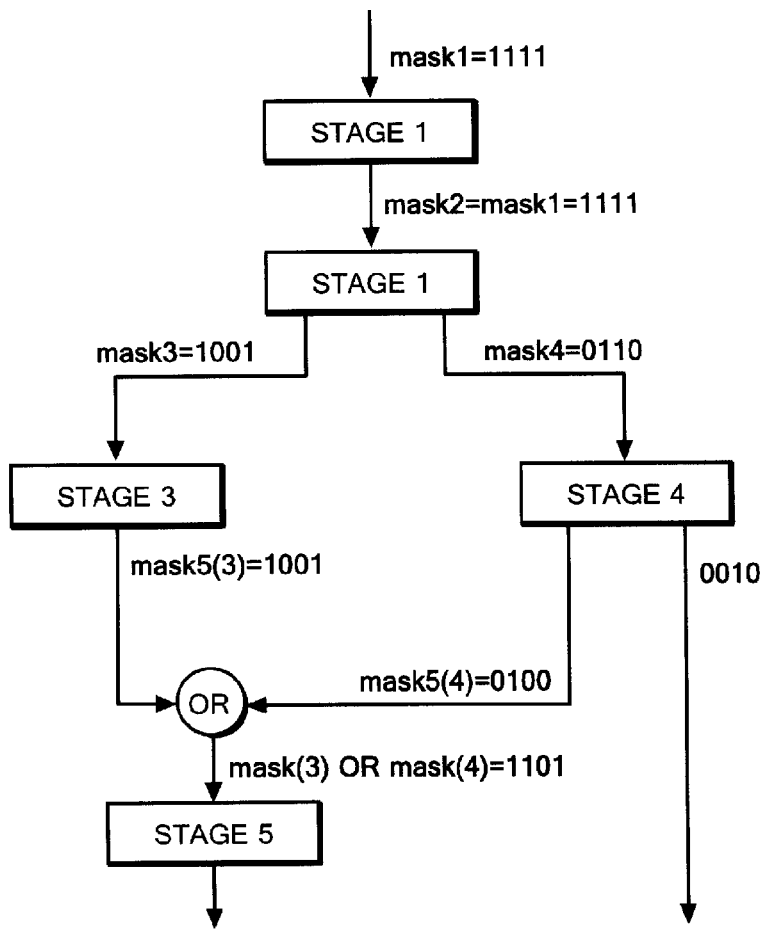

FIG. 6 transfer_transaction (int job_id, int dst_account, int src_account, int amount)

sql("BEGIN TRANSACTION");
sql("UPDATE account_table SET balance = balance – $amount WHERE account =$src_account");
sql("UPDATE account_table SET balance = balance + $amount WHERE account =$dst_account");
result = sql("SELECT * from account_table WHERE account=$src_account");
if (result.balance < 0) {
 sql_rollback();
 transfer_error(transaction_id, dst_account, src_coount, amount);
else {
 sql_commit();
 transfer_done(transaction_id, dst_account, src_coount, amount);

FIG. 7 transfer_transaction (int job_id, int dst_account, int src_account, int amount)
{ sql("BEGIN TRANSACTION");    STAGE 1 sql("UPDATE account_table SET balance = balance – $amount WHERE account=$src_account");    STAGE 2 sql("UPDATE account_table SET balance = balance + $amount WHERE account=$dst_account");    STAGE 3 result = sql("SELECT * from account_table WHERE account=$src_account");    STAGE 4 if (result.balance < 0) {    STAGE 5 sql_rollback();    STAGE 6 transfer_error(transaction_id, dst_account, src_coount, amount);    STAGE 7

} else { sql_commit();    STAGE 8 transfer_done(transaction_id, dst_account, src_coount, amount);    STAGE 9

FIG. 8 batch_transfer transaction (int num_jobs, int job_id[],
                            int dst_account[], int src_account[], int amount[])

```
                                                                    STAGE 1
sql("BEGIN TRANSACTION");
```

```
                                                                    STAGE 2
MaskVector mask2 = (1 << num_jobs) - 1;
String sql_statements1= NULL;
for (i = 0; i < num_jobs; i++)
  if (mask2 & (1 << i))
    sql_statements1+=
    "UPDATE account_table SET balance=balance-"+amount[i]+"  WHERE account="
    +src_account[i]+";";
sql(sql_statements1);
```

```
                                                                    STAGE 3
MaskVector mask3 = mask2;
String sql_statements2 = NULL;
for (i = 0; i < num_jobs; i++)
  if (mask3 & (1 << i))
    sql_statements2 +=
    "UPDATE account_table SET balance=balance+"+amount[i]+"  WHERE account="
    +dst_account[i]+";";
sql(sql_statements2);
```

FIG. 9

```
                                                              STAGE 4
MaskVector mask4 = mask3;
String sql_statements3 = "SELECT * from account_table WHERE account=
"+src_account[i];
for (i = 1; i < num_jobs; i++)
  if (mask4 & (1 << i))
    sql_statements3+= " OR account="+src_account[i];
  sql_statements3 += ";";
results = sql(sql_statements3);
```

```
                                                              STAGE 5
MaskVector mask5 = mask4, mask6 = 0;
for (i = 0; i < num_jobs; i++)
  if (mask5 & (1 << i)) {
    result = ResultLookup(results, "accoount", src_account[i]);
    if (result.balance < 0) mask6 = mask6 | (1 << i);
  }
```

FIG. 10

```
                                                              STAGE 6
if (mask6) {
   sql_rollback();
```

```
                                                              STAGE 7
   for (i = 0; i < num_jobs; i++)
     transfer_transaction(job_id[i], dst_account[i], src_account[i], amount[i]);
```

} else {

```
                                                              STAGE 8
   sql_commit();
```

```
                                                              STAGE 9
   for (i = 0; i < num_jobs; i++)
     transfer_done(job_id[i], dst_account[i], src_account[i], amount[i]);
```

FIG. 11

CONVERTER, SERVER SYSTEM, CONVERSION METHOD AND PROGRAM

CROSS REFERENCE TO RELATED APPLICATION

This application claims priority under 35 U.S.C. 119 from Japanese Patent Application No. 2008-66695, filed Mar. 14, 2008, the entire contents of which are incorporated herein by reference.

BACKGROUND OF THE INVENTION

1. Field of the Invention

The present invention relates to a converter, a server system, a conversion method and a program. In particular, the present invention relates to a converter, a server system, a conversion method and a program for generating a batch processing program for collectively processing a plurality of job requests.

2. Description of Related Art

In a server system for implementing a web application and a banking system or the like, online transaction processing is performed in which a server processes a job request provided from a client and then replies to the client with a result of the processing. Such a server system needs to instantly process a vast amount of job requests, so that the server system has become a large scale system.

In such online transaction processing performed by the server system, since each processing is independently performed for each job request, various overheads are redundantly needed during a series of processings for multiple job requests. In a case of executing online transaction processing involving access to a database server, for example, an application server needs to start an application program and to communicate with the database server in response to every job request.

In order to overcome such inconvenience, a server system that executes a batch program for collectively processing an appropriate number of job requests has been proposed ("Development of System Architecture and Middleware Product Achieving Large Scale and High Speed Transaction Processing (originally in Japanese, daikibo kousoku transaction shyori wo jitsugen suru system architecture narabini middleware seihin wo kaihatu)" by NEC Corporation, press release announced on the official website of NEC Corporation on Sep. 26, 2007, Internet URL: <http://www.nec.co.jp/press/ja/0709/2601.html>). Such a server system only needs to make a single access to a database server for each plurality of job requests in a collective manner. Accordingly, the frequencies of starting an application program and of communications with a database server can be reduced. As a result, such a server system enables online transaction processing with an improvement in the throughput of the entire system by reducing processing overheads, which might be redundantly required to perform a series of multiple processings for each plurality of job requests.

A technique for collectively processing a plurality of queries by reconfiguring a program itself of a database server is proposed in Non-Patent Document 2 (Harizopoulos, S. and Ailamaki, A., "Improving instruction cache performance in OLTP," "ACM Trans. Database Syst. 31, 3 (September 2006)," 887-920). According to such a technology, processing throughput in a database server can be improved.

For the server system described in Non-Patent Document 1, however, a batch program for collectively processing a plurality of job requests has to be newly developed, which results in a large amount of development work and costs. In addition, since the development of the batch program requires consistency among job requests, the development is difficult as compared with development of an application program causing a server system to execute processing of a single job request. Furthermore, the technology described in Non-Patent Document 2 requires a change in the program itself of a database server to a large extent, so that it is difficult to apply the technology to the existing database servers.

SUMMARY OF THE INVENTION

In view of the foregoing background, an object of the present invention is to provide a converter, a server system, a conversion method and a program capable of solving the aforementioned problems. In order to solve the aforementioned problems, a first aspect of the present invention provides a converter for converting an application program to be executed for every job request into a batch processing program for collectively processing the plurality of job requests. The converter includes: a code identifier; an integration unit; a multiplexing unit; and an output unit. The code identifier identifies a portion of the application program that includes a code to issue a service request to another server, and a portion of the application program that does not include such a code. The integration unit converts the service request code in the application program into a collective service request code that requests a plurality of services corresponding to the plurality of job requests. The multiplexing unit converts the processing code in the application program into a code that multiplexes the execution of multiple processings corresponding to the plurality of job requests. The output unit outputs, as the batch processing program, the application program that the integration unit and the multiplexing unit have processed. In addition, the present invention provides a server system including the converter, and a method and a program each of which causes a computer to function as the converter

BRIEF DESCRIPTION OF THE DRAWINGS

For a more complete understanding of the present invention and advantages thereof, reference is now made to the following description taken in conjunction with the accompanying drawings.

FIG. 6 shows an example of a flow in an execution order of stages in an application program having six stages (stages 1 to 6). FIG. 6 also shows an example of mask vectors (mask1 to mask6) generated respectively for the six stages.

FIG. 7 shows an example of an application program described using a pseudo-code.

FIG. 8 shows an example of separating the application program shown in FIG. 7 into each stage.

FIG. 9 shows an example of descriptions of the stages 1 to 3 of a batch processing program converted from the application program shown in FIG. 7.

FIG. 10 shows an example of descriptions of the stages 4 to 5 of the batch processing program converted from the application program shown in FIG. 7.

FIG. 11 shows an example of descriptions of the stages 6 to 9 of the batch processing program converted from the application program shown in FIG. 7.

DETAILED DESCRIPTION OF THE PREFERRED EMBODIMENT

Hereinafter, the present invention will be described through its preferred modes for carrying out the present invention. The preferred embodiments, however, do not limit the scope of claims.

Figure 1:
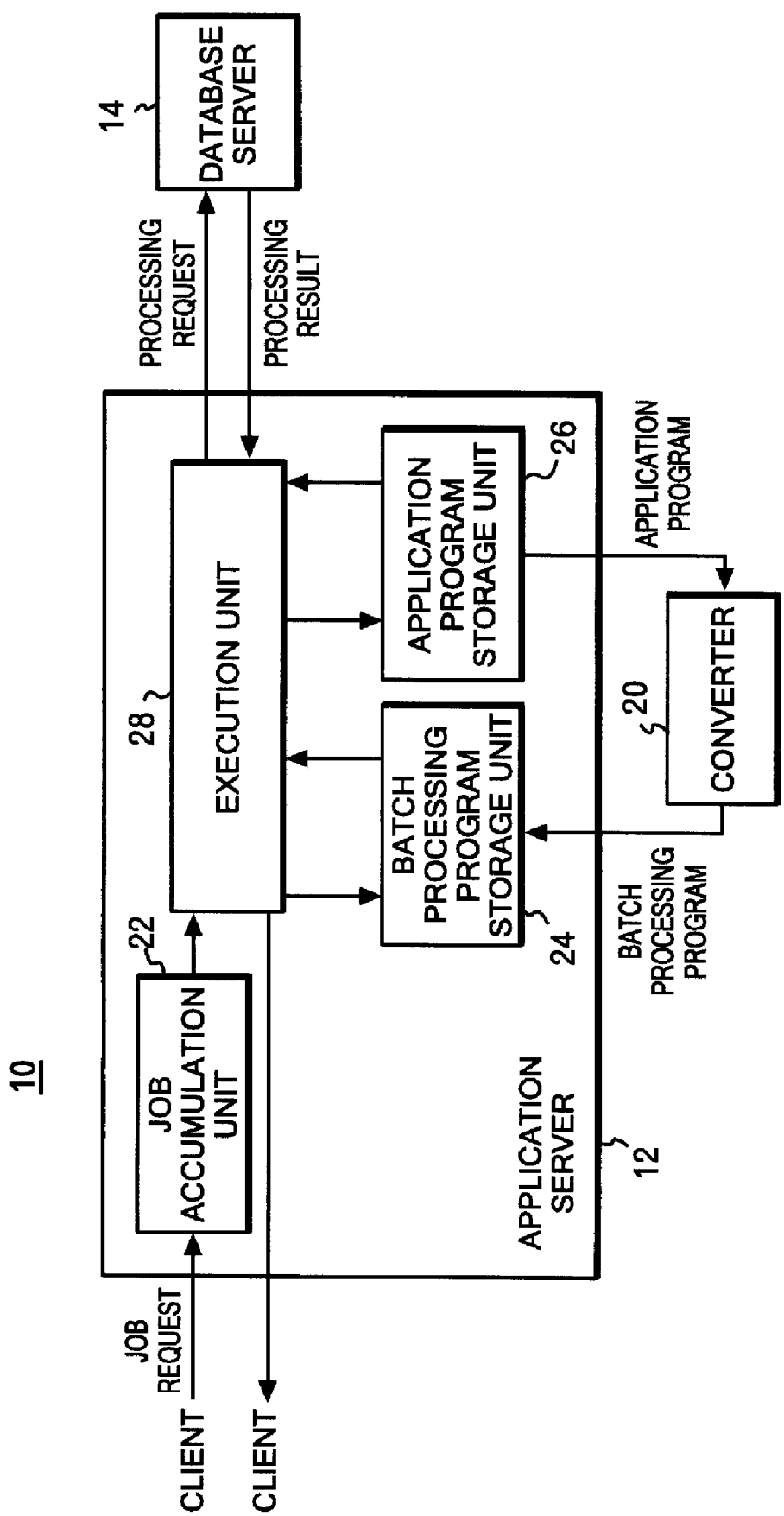
FIG. 1 shows a configuration of a server system 10 according to the present embodiment.

Referring to FIG. 1, a configuration of a server system 10 according to the present embodiment is shown. The server system 10 executes processing in accordance with a job request provided by one or a plurality of clients (terminal devices, for example) and then responds to the client with the processing result. The server system 10 includes an application server 12, a database server 14 and a converter 20.

The application server 12 receives a job request from a client via a network. The application server 12 calls a batch processing program and then executes processing in accordance with the received job request. In addition, when the application server 12 cannot execute the processing in accordance with the job request by use of a batch processing program, the application server 12 calls an application program and executes the processing. In this manner, the application server 12 can execute processing in accordance with a received job request.

During execution of the processing in accordance with a job request, the application server 12 is allowed to obtain the processing result by issuing a service request to a backend server such as a database server 14 (a server at a later stage than that of the application server 12). Then, the application server 12 transmits the processing result in accordance with the job request to the corresponding client via a network. Note that the application server 12 may be configured to distribute its load by use of one or a plurality of servers.

The application server 12 includes a job accumulation unit 22, a batch processing program storage unit 24, an application program storage unit 26 and an execution unit 28. The job accumulation unit 22 accumulates a plurality of job requests provided by a client.

The batch processing program storage unit 24 stores a batch processing program, which collectively processes a plurality of job requests. Specifically, the batch processing program storage unit 24 stores a batch processing program to be called and executed once for each plurality of job requests.

The application program storage unit 26 stores an application program to be called and executed every time for each of the plurality of job requests. Specifically, the application program storage unit 26 stores an application program to be called and executed every time for an individual job request.

The execution unit 28 calls and executes a batch processing program for each plurality of job requests, and then outputs a plurality of execution results corresponding to the plurality of job requests. In addition, in a case where processing in accordance with a job request cannot be executed by use of a batch processing program, the execution unit 28 is allowed to call and execute a plurality of application programs in accordance with a plurality of job requests and then to output a plurality of processing results corresponding to the plurality of job requests.

The database server 14 stores information in a database. The database server 14 executes processing such as searching for, updating or deleting a database record in accordance with a service request provided by the application server 12. Then, the database server 14 responds to the application server 12 with a result of the processing. It should be noted that the server system 10 may be configured to include a server other than the database server 14 as a backend server for receiving a service request from the application server 12.

The converter 20 converts an application program into a batch processing program. The application server 12 is allowed to read an application program stored in the application program storage unit 26 and then to convert the application program into a batch processing program, automatically, for example. Then, the application server 12 is also allowed to write the generated batch processing program into the batch processing program storage unit 24. The configuration of the converter 20 and processing performed by the converter 20 will be described in detail below with reference to FIG. 4.

Figure 2:
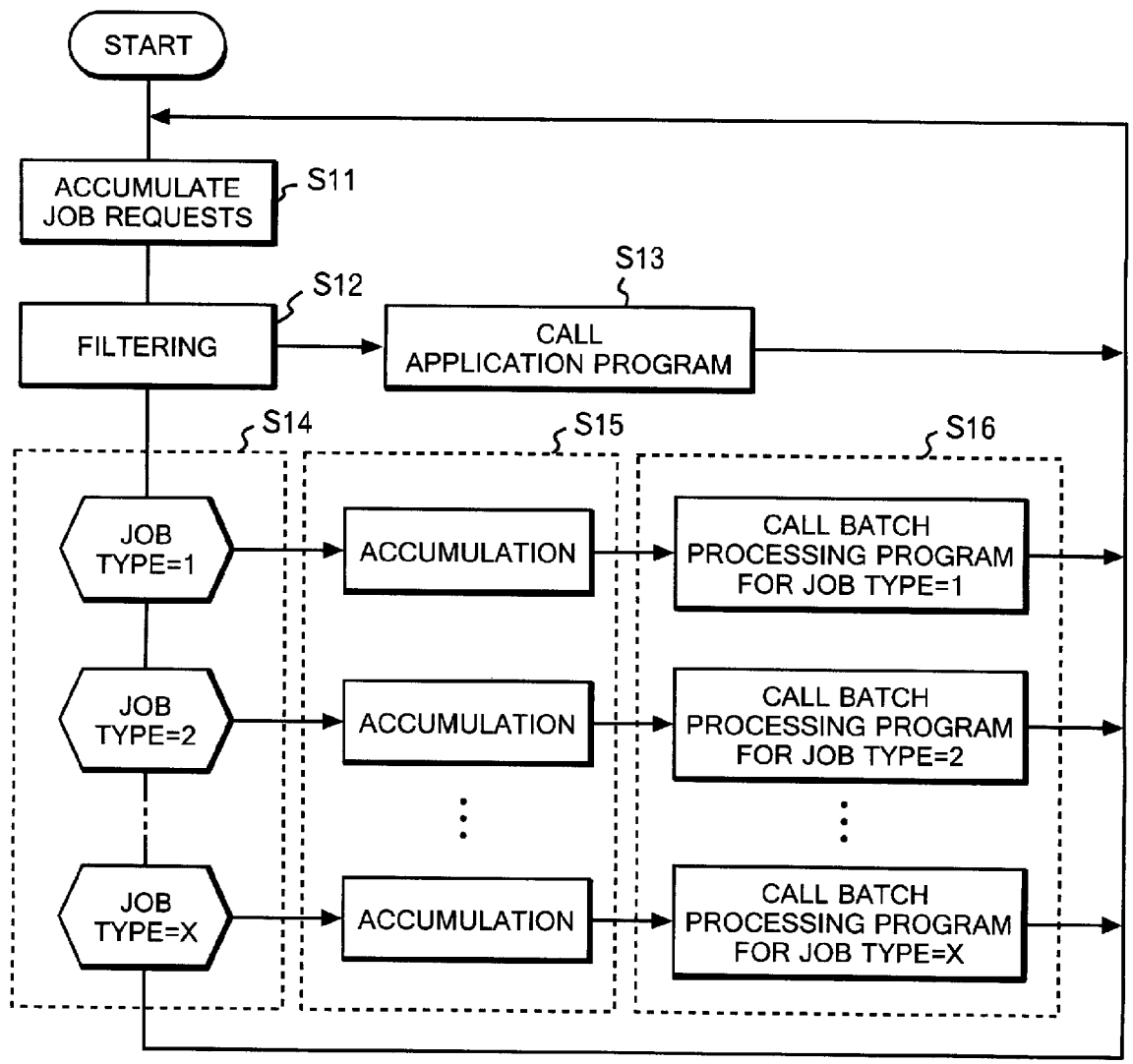
FIG. 2 shows a processing flow of the server system 10.

FIG. 2 shows a processing flow of the server system 10. First, upon receipt of a job request from a client, the server system 10 accumulates the received job request (step S11).

Subsequently, the server system 10 extracts a job request having a dependency relationship with any other job request from the accumulated job requests (step S12). For example, by use of a filter previously designed by a user, the server system 10 extracts a job request having an influence on a processing result of any other job request. The server system 10 is allowed to register processing possibly having a dependency relationship with any one of the job requests and then to determine, by detecting an ID or the like of a received job request, whether or not the received job request is for executing the registered processing.

In a case where the server system 10 receives a job request having a dependency relationship with any other job request, the server system 10 calls and executes an application program corresponding to a type of the extracted job request (step S13). The server system 10 is thereby allowed to individually execute processing corresponding to the job request having a dependency relationship with any other job request.

Note that in online transaction processing, in many cases a plurality of job requests that arrive approximately at the same time do not have a dependency relationship with one another. Accordingly, the server system 10 may be configured not to perform the processing of steps S12 and S13.

Subsequently, the server system 10 determines in step S12 whether the job request does not have a dependency relationship with any other job request (step S14). Then, on condition that a predetermined number of job requests (the number of job requests to be collectively processed by a corresponding batch request program) are accumulated for each type (step S15), the server system 10 calls and executes a batch processing program for processing a corresponding type of job requests (step S16). In place of this, the server system 10 may be configured to accumulate job requests for each type and then to call and execute a batch processing program for processing a corresponding type of job requests at every constant time interval, for example.

As described above, the server system 10 calls and executes a batch processing program once for each plurality of job requests. The server system 10 thereby enables online transaction processing with improvement in the throughput of the entire system by reducing processing overheads redundantly needed during a series of processings for multiple job requests.

It should be noted that in a case where a batch processing program for processing a given job request does not exist, the server system 10 is allowed to call an application program corresponding to the job request multiple times. In addition, in step S15, in a case where a predetermined number of job requests are not accumulated even when a predetermined period of time has passed, for example, the server system 10 is also allowed to call an application program multiple times instead of calling a batch processing program.

As a variation of the present embodiment, the converter 20 may be configured to generate a batch processing program in which the number of job requests to be collectively processed can be specified by providing parameters or the like. In this case, the execution unit 28 of the server system 10 determines the number of job requests to be collectively processed according to a response time of the server system 10 for a given job request, and then causes the called batch processing program to collectively process the determined number of job requests. Thereby, the server system 10 is allowed to collectively process an optimum number of job requests in accordance with the processing load of the server system 10.

Figure 3:
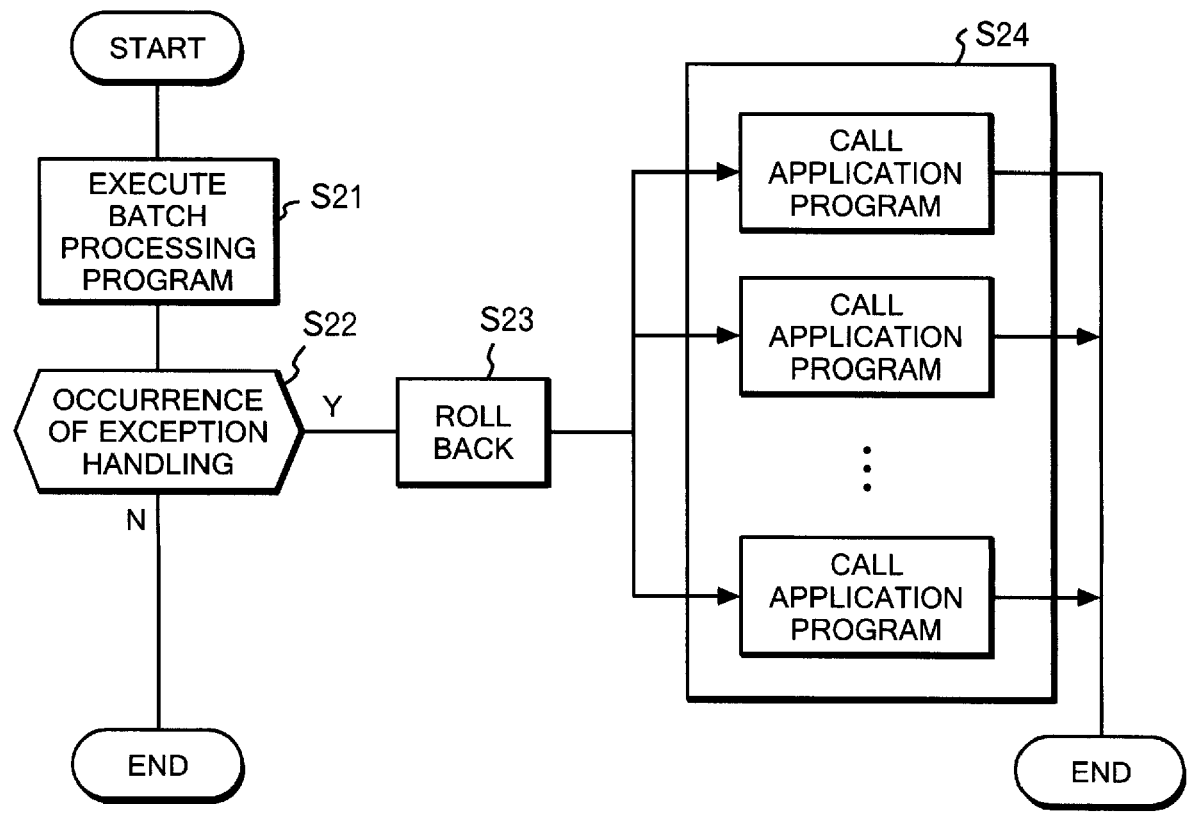
FIG. 3 shows a processing flow of the server system 10 in a case where a batch processing program is called in step S16 shown in FIG. 2.

FIG. 3 shows a processing flow of the server system 10 in a case where a batch processing program is called in step S16 shown in FIG. 2. First, the server system 10 starts execution of the called batch processing program (step S21).

Subsequently, the server system 10 determines whether or not an exception occurs during the execution of the batch processing program (step S22). The exception herein refers to processing that gives an influence on a processing result of any other job request (side effect) or that has a possibility of causing such a side effect. As an example, the exception includes processing for calling an application program interface (API) or a library that causes a side effect, and processing for inputting/outputting data or the like. Moreover, the exception may be processing for rolling back a service request to be processed for the database server 14 in accordance with any one of the job requests, for example.

In a case where an exception does not occur during execution of the batch processing program (NO in step S22), the server system 10 ends the processing without performing the aforementioned processing. As a result of this, the server system 10 can output a plurality of processing results corresponding to the plurality of job requests.

In a case where an exception occurs during execution of the batch processing program, the server system 10 rolls back all the processing that has been performed so far in accordance with the plurality of job requests (step S23). Subsequently, the server system 10 calls and executes an application program in accordance with each of the plurality of job requests (step S24). As a result of this, the server system 10 can output a plurality of processing results corresponding to the plurality of job requests.

In the manner described above, the server system 10 executes a batch processing program, in a case where exception does not occur, in accordance with a plurality of job requests. Then, in a case where an exception such as a side effect occurs during execution of the batch processing program, the server system 10 rolls back once all the processing that has been performed for the plurality of job requests up to this point, and thereafter, re-executes an application program multiple times in accordance with the plurality of job requests.

Thereby, server system 10 can output consistent processing results in accordance with a plurality of job requests. In addition, since a batch processing program used by the server system 10 does not have to handle exceptions in a collective manner, the program can be easily developed.

Figure 4:
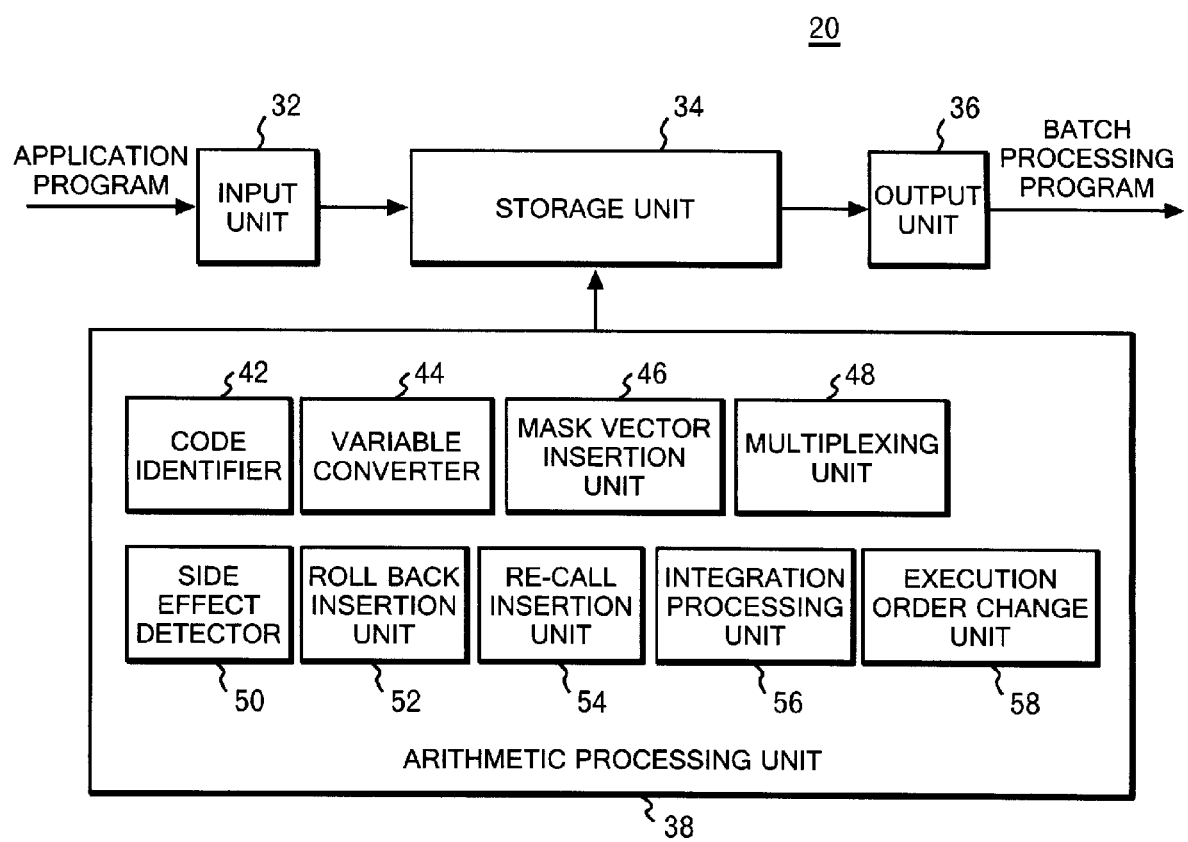
FIG. 4 shows a configuration of a converter 20 according to the present embodiment.

FIG. 4 shows a configuration of the converter 20 according to the present embodiment. The converter 20 converts an application program to be executed for every job request into a batch processing program for collectively processing the plurality of job requests.

The converter 20 is provided with an input unit 32, a storage unit 34, an output unit 36 and an arithmetic processor 38. The input unit 32 receives an application program from the application program storage unit 26 and writes the application program into the storage unit 34.

The storage unit 34 stores the application program therein. In addition, the storage unit 34 stores a batch processing program generated on the basis of the application program. The output unit 36 reads the batch processing program from the storage unit 34 and outputs the batch processing program to the batch processing program storage unit 24.

The arithmetic processor 38 converts the application program stored in the storage unit 34 into a batch processing program and causes the converted batch processing program to be stored in the storage unit 34. More specifically, the arithmetic processor 38 analyzes codes in the application program stored in the storage unit 34. Then, the arithmetic processor 38 generates codes for a batch processing program to be stored in the storage unit 34, by performing processing such as searching for, duplicating, deleting, converting, rearranging and the like of each of the codes, and further inserting a new code in the application program.

The arithmetic processor 38 includes a code identifier 42, a variable converter 44, a mask vector insertion unit 46, a multiplexing unit 48, a side effect detector 50, a roll back insertion unit 52, a recall insertion unit 54, an integration processing unit 56 and an execution order change unit 58. Each of these components may be a functional block implemented, for example, by executing a converter program by the arithmetic processor 38.

Figure 5:
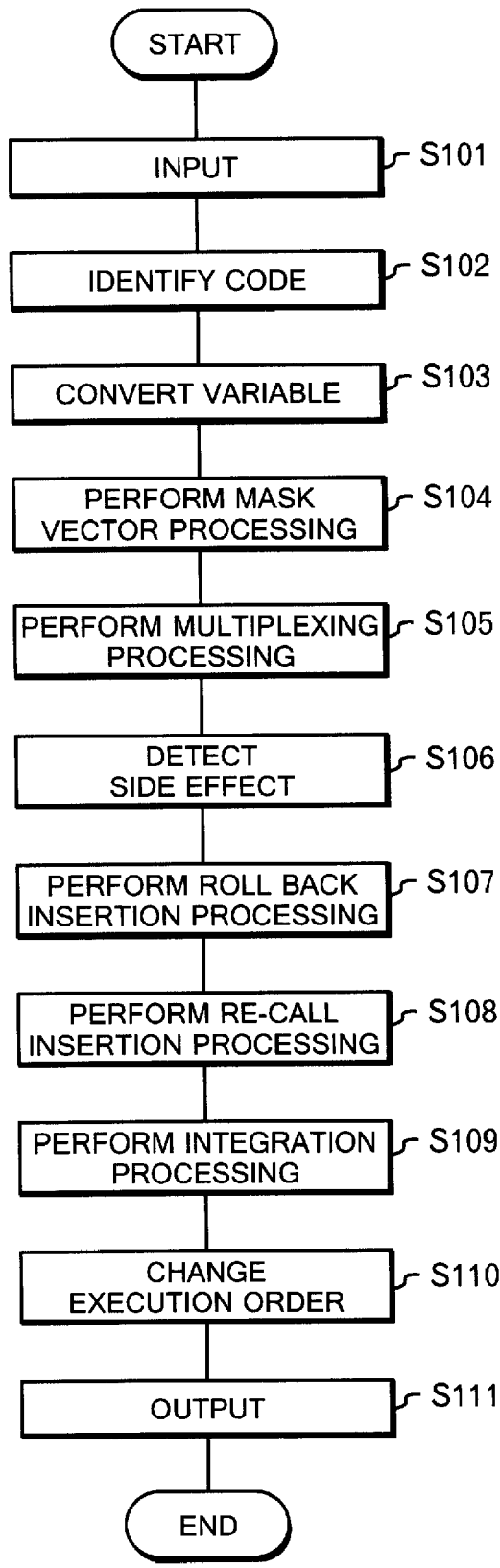
FIG. 5 shows a processing flow of processing performed by the converter 20.

FIG. 5 shows a processing flow of the converter 20. Upon receipt of an instruction to start processing from a user, for example, the converter 20 first receives an application program from the application program storage unit 26 and writes the application program into the storage unit 34 in step S101.

Subsequently, in step S102, the code identifier 42 sequentially reads and analyzes codes of the application program. Then, the code identifier 42 identifies, in the application program, a portion including a code for issuing a service request to another server, and a portion that does not include such a code.

In this embodiment, the code identifier 42 separates a code string included in an application program into multiple stages. More specifically, the code identifier 42 separates a code string included in an application program into an SQL stage including a service request to the database server 14 and a program stage not including a service request to the database server 14.

Subsequently, in step S103, the variable converter 44 converts a variable in the application program into a vector variable, where each index of the vector variable respectively corresponds to each job in a plurality of job requests. If the number of job requests to be collectively processed by the batch processing program is N, for example, the variable converter 44 converts each variable (A, for example) in the application program into a vector variable to which N pieces of indices are assigned ($A[1, 2, 3, \ldots, N]$). The code identifier 42 is thereby allowed to convert an application program into a program with vector variables each collectively storing multiple parameters occurring in correspondence to the multiple job requests, respectively.

Subsequently, in step S104, the mask vector insertion unit 46 inserts a code generating a mask vector into the application program, for each of the plurality of stages. In this embodiment, a mask vector may be an array where each index of the array corresponds to a job request in a plurality of job requests to be collectively processed, and also where each element in the array holds a value that indicates whether or not a job request corresponding to one of the indices executes the corresponding stage.

The mask vector insertion unit 46 described above is allowed to insert, in each stage of an application program, a control code for controlling whether or not to execute the corresponding stage for each of the plurality of job requests. It should be noted that a description of the contents of a mask vector will be described in more detail with reference to FIG. 6.

Subsequently, in step S105, the multiplexing unit 48 converts a processing code for executing processing other than a service request in the application program into a code that multiplexes the execution of multiple processings corresponding to a plurality of job requests. In this embodiment, the multiplexing unit 48 converts a code described in a program stage into a multiplexed code. The multiplexing unit 48 is thereby allowed to convert an application program into a program for executing multiple processings corresponding to a plurality of job requests.

As an example, the multiplexing unit 48 is allowed to insert, into an application program, a code for causing a processing code of each program stage to run a loop for the number of job requests to be processed. Furthermore, the multiplexing unit 48 is allowed to insert, in an application program, a code for sequentially shifting an index value of vector variables in each program stage at each iteration of the loop, for example.

Moreover, in step S105, the multiplexing unit 48 inserts, into the application program, a control code for executing the program stage only for a job request specified by a mask vector, for example. The multiplexing unit 48 can thereby convert an application program into a program for executing the program stage only for a corresponding job request to be executed.

Subsequently, in step S106, the side effect detector 50 detects, in the application program, a code for executing processing that has an influence on a processing result of any other job request. The processing that has an influence on a processing result of any other job request may be, for example, processing for calling an API or a library generating a side effect and processing for inputting and outputting data or the like. The side effect detector 50 is allowed to detect an applicable code by comparing each code in an application program with a code previously registered by a user as a code generating a side effect (or a code having a possibility of generating a side effect).

In addition, there is a case where an application program includes a code to issue a roll-back request to the database server 14. In this case, the side effect detector 50 detects the roll-back request code as a side-effect code, which has an influence on a processing result of any other job request.

Subsequently, in step S107, the roll back insertion unit 52 inserts, as a code before the code detected by the side effect detector 50, in an application program, a code for issuing a roll back request to roll back all the service requests issued for all of the plurality of job requests. Specifically, the roll back insertion unit 52 is allowed to insert a code for issuing a roll back request as a code before a code for executing processing to call an API or library generating a side effect and processing for inputting and outputting of data, as an example.

Moreover, the roll back insertion unit 52 is allowed to insert a code for issuing a roll back request on condition that the roll back request is to be issued for any of job requests, for example. Accordingly, in a case where processing that has an influence on a processing result of any other job request is to be performed in accordance with any one of job requests, the roll back insertion unit 52 is allowed to convert, before the processing is executed, an application program into a program for rolling back all of the processing performed in accordance with a plurality of job requests.

Subsequently, in step S108, in a case where the roll back insertion unit 52 inserts a code for issuing a roll back request into the application program, the recall insertion unit 54 inserts, into the corresponding application, a code for calling an individual application in accordance with each of a plurality of job requests. Accordingly, the roll back insertion unit 52 and the recall insertion unit 54 can convert an application program into a program that outputs consistent processing results for a plurality of job requests.

Subsequently, in step S109, the integration processing unit 56 converts, in an application, a code to issue a service request to another server into a collective service request code for collectively issuing a plurality of service requests corresponding to a plurality of job requests. In this embodiment, the integration processing unit 56 converts a code described in an SQL stage into a collective service request code.

An application program can include, as a service request, a query for issuing a service request to the database server 14, for example. In this case, the integration processing unit 56 is allowed to convert a code for issuing a query in an application program into a collective service request code in which a plurality of queries corresponding to a plurality of job requests are listed and described in a single description. The integration processing unit 56 is thereby allowed to generate a program with less overhead, the overhead being produced due to the processing of a plurality of queries performed by the database server 14.

In addition, rather than the aforementioned manner, the integration processing unit 56 is allowed to convert a code for issuing a query in an application program into a code for issuing a combined query obtained by combining a plurality of queries corresponding to a plurality of job requests. Thereby, the integration processing unit 56 can generate a program having less overhead by reducing the number of executions of queries in the database server 14.

Moreover, there is a case where a code for issuing a query, included in an application program, is described in a SELECT statement for access to a database table. In this case, the integration processing unit 56 is allowed to describe a code for issuing a combined query, in a SELECT statement having a sum of sets of multiple WHERE conditions corresponding to a plurality of job requests (sets by OR operation) as the WHERE condition, for example. In addition, in a case where job requests have the same WHERE condition, the integration processing unit 56 is allowed to integrate WHERE conditions into one, for example.

Then, in a case where the aforementioned combined query is generated, the integration processing unit 56 re-evaluates query results of the combined query by use of WHERE conditions respectively corresponding to a plurality of job requests, and then inserts, into an application program, a code for assigning each of the re-evaluated query results to a corresponding one of the query results of the plurality of job requests. It should be noted that in a case where processing time for assigning a query result of a combined query to each of a plurality of job requests is longer than a predetermined period of time, for example, the integration processing unit 56 is allowed to convert a code for issuing a query, included in an application program, into a collective service request code obtained by listing and integrating a plurality of queries into a single description.

In case the plurality of queries corresponding to a plurality of job requests are all the same, the integration processing unit 56 is allowed to insert, into an application program, a code for assigning one query result corresponding to one job request to all the query results of a plurality of job requests.

In step S109, the integration processing unit 56 inserts, into the application program, a control code for executing the SQL stage only for a job request specified by a mask vector. Thereby, the integration processing unit 56 can convert the application program into a program for executing the SQL stage for only a corresponding job request.

The integration processing unit 56 described above can convert an application program into a program that integrates multiple service requests into a single code and then issues the code. Thereby, the integration processing unit 56 can generate a program that achieves online transaction processing with improvement in the throughput of the entire system by reducing processing overheads redundantly needed during a series of processings for multiple job requests.

Subsequently, in step S110, the execution order change unit 58 rearranges the order of stages of an application program in order for a code including a roll back request to be executed earlier. Thus, execution order change unit 58 can generate a program that has the minimum computation amount when calling multiple application programs.

In addition, the execution order change unit 58 rearranges the order of stages of an application program in order that a code including a commitment request (Commit) will be executed at a later time. Here, the commitment request is a request to reflect processing, having been requested to the database server 14, on the database record. For example, the execution order change unit 58 may rearrange stages in order that the code including the commitment request will be executed, in a case where there is no executable stage other than that including a code with the commitment request.

It should be noted that in step S110, the execution order change unit 58 rearranges the order of stages to an extent not resulting in an inconsistency in the execution result. Specifically, the execution order change unit 58 rearranges the order of stages in a manner that each of a plurality of stages is to be executed after a stage that is to be executed prior to execution of the corresponding one of the stages.

Subsequently, in step S111, the output unit 36 outputs, as a batch processing program, the application program that has been subjected to the processing in steps S102 to S110. In other words, the output unit 36 outputs, as a batch processing program, an application program that has been subjected to the processing including code conversion, insertion, rearrangement and the like performed by the variable conversion unit 44, the mask vector insertion unit 46, the multiplexing unit 48, the roll back insertion unit 52, the recall insertion unit 54, the integration processing unit 56 and the execution order change unit 58.

As described above, the converter 20 can convert an existing application program (that is, an application to be executed for every job request) into a batch processing program for executing multiple online transactions online in a collective manner. Thereby, a batch processing program can be generated with less development resources according to the converter 20.

FIG. 6 shows an example of a flow of an execution order of stages in an application program having six stages (stages 1 to 6) and of mask vectors (mask1 to mask6) respectively generated for the six stages. It should be noted that each of the mask vectors shown in FIG. 6 stores values (1 or 0) each specifying whether or not to execute a corresponding stage in respective four indices corresponding to respective four job requests.

The mask vector insertion unit 46 is allowed to insert, into an application program, a code for generating a mask vector specifying that all of the plurality of job requests to be collectively processed are processed at the top stage. In the case shown in FIG. 6, the mask vector insertion unit 46 inserts, into the application program, a code for storing a value (1) indicating execution of the stage for all indices of the mask vector (mask1) of the stage 1 for the top stage.

There is also a case where a certain stage is executed before a next stage is to be executed following the certain stage, where the certain stage does not branch to multiple other stages and where multiple other stages are not merged into the next stage (a relationship of stages when the certain stage has one exit point of a certain stage and the next stage has one entry point). In this case, the mask vector insertion unit 46 is allowed to insert, into an application program, a code for generating a mask vector of a certain stage to be taken over by the next stage without any modification, for example.

Referring to FIG. 6, the application program shown corresponds to a case where the relationship of a stage 1 (one stage) and a stage 2 (next stage) is the relationship of stages when the aforementioned one stage has one exit point and the next stage has one entry point. Accordingly, in the case of the application program shown in FIG. 6, the mask vector insertion unit 46 is allowed to insert, into an application program, a code for causing the values of the respective indices of the mask vector (mask1) of the stage 1 to be taken over by the stage 2 as the values of the respective indices of the mask vector (mask2) of the stage 2 without any modification.

There is a case where a plurality of next stages to be executed exist subsequently to one stage (a relationship between one stage and the next stages of a case where the one stage has multiple exit points) in an application program. In the example shown in FIG. 6, the mask vector insertion unit 46 is allowed to insert, into an application program, a code for generating each of the indices of the mask vector of the one stage to be taken over by one of the mask vectors of the plurality of next stages as a value of the index for the corresponding one of the plurality of next stages.

In the application program shown in FIG. 6, the relationship of the stage 2 (one stage) with stages 3 and 4 (the plurality of next stages) corresponds to the relationship of the case where multiple exit points of the aforementioned one stage exist. In the example shown in FIG. 6, the first and the fourth values of the indices of the mask vector (mask2) of the stage 2 are taken over by the stage 3 as the first and the fourth values of the indices of the mask vector (mask3) of the stage 3. In addition, the second and the third values of the indices of the mask vector (mask2) of the stage 2 are taken over by the stage 4 as the second and the third values of the indices of the mask vector (mask4) of the stage 4.

Furthermore, in an application program, there is a case where there exist a plurality of preceding stages to be executed immediately before the following stage (a relationship between a stage having multiple entry points and stages each to be executed immediately before the stage). In such a case, the mask vector insertion unit 46 is allowed to insert, into an application, a code for generating a mask vector of the stage by performing, for each of the indices, an OR operation on the plurality of mask vectors of the stage by which the values are taken over from the plurality of preceding stages, respectively, for example.

In the application program shown in FIG. 6, the relationship of a stage 5 (one stage) with the stages 3 and 4 (plurality of preceding stages) corresponds to the relationship of one stage and preceding stages in a case where multiple entry points exist in the aforementioned one stage. In this example, the mask vector insertion unit 46 inserts, into an application program, a code for generating a mask vector (mask5) of the stage 5 by performing, for each of the indices, an OR operation on the mask vectors (mask5 (3) and mask5 (4)) of the stage 5, the mask vectors being respectively taken over from the stages 3 and 4.

As described above, the mask vector insertion unit 46 inserts a code for generating a mask vector of each stage into an application program. The batch processing program is thereby controlled so that multiple processing corresponding to a plurality of job requests can be executed without having inconsistency between the processing.

FIG. 7 shows an example of an application program described using a pseudo-code. FIG. 8 shows an example of the application separated into stages.

The exemplary application program shown in FIG. 7 executes processing for transferring amount from a src_account record of an account_table table to a dst_account record of the account_table table. Then, in a case where the value of the src_account record (balance) becomes negative, the application program of the example shown in FIG. 7 rolls back the processing that has been performed up to this point and then executes an error processing. On the other hand, in a case where the value of the src_account record (balance) does not become negative, the application program of the example shown in FIG. 7 commits the processing that has been performed up to this point to the database and then executes a success processing.

Specifically, in a stage 2, the record is updated by subtracting amount from the value (balance) in an account field of the src_account record. Subsequently, in a stage 3, the record is updated by adding amount to the value (balance) of an account field of the dst_account record.

Subsequently, in a stage 4, the value (balance) in the account field of the src_account record is read using a query, and then, a result of the query is stored in result. Subsequently, in a stage 5, whether or not result is less than 0 is determined.

Next, in a stage 6, on condition that result is less than 0, a roll back request to roll back the processing that has been performed up to this point to the database server 14 is issued, and an error processing is executed in a subsequent stage 7. On the other hand, in a stage 8, on condition that result is not less than 0, a commitment request is issued for committing to the database record the processing that has been requested to the database server 14 up to this point, and then, a success processing of the transfer is executed in a subsequent stage 9.

FIGS. 9, 10 and 11 show an example of a batch processing program converted from the application program shown in FIG. 7. FIG. 9 shows descriptions of the stages 1 to 3, FIG. 10 shows descriptions of the stages 4 to 5 and the FIG. 11 shows descriptions of the stages 6 to 9.

The stages 2 and 3 show an example of an SQL stage. In the stages 2 and 3, a collective service request code is shown, obtained by listing and integrating a plurality of queries corresponding to a plurality of job requests in a single description. In addition, in the stages 2 and 3, vector variables (src_account[i], dst_account[i] and amount[i]) are described.

The stage 4 is an example of an SQL stage. In the stage 4, a code for issuing a combined query obtained by combining a plurality of queries corresponding to a plurality of job requests is described. To be more specific, in the stage 4, a code for issuing a combined query described by a SELECT statement having a sum of sets of multiple WHERE conditions corresponding to a plurality of job requests (sets by OR operation) as the WHERE condition is described.

The stage 5 shows an example of a program stage. The stage 6 shows an example of an SQL stage.

In the stage 6, a code for issuing a roll back request is described. In the stage 5, described is a code for jumping to the stage 6 and for rolling back the processing of all of the job requests in a case where a condition for executing the code of the stage 6 becomes true for any one of the plurality of job requests. To be more specific, in the stage 5, described is a code for reevaluating, by use of ResultLookup ( ) function, query results of the combined query on the basis of WHERE conditions respectively corresponding to the plurality of job requests, and then for assigning each of the reevaluated results to a corresponding one of the query results of the plurality of job requests. Specifically, since the WHERE condition of each of the job requests in the application program of FIG. 7 is account, a code for selecting a record having account corresponding to each of the job requests from the query results of a combined query is described in the stage 5.

The stage 7 shows an example of a program stage. In the stage 7, a code for executing an error processing to be executed in a case where the roll back processing is performed is described. To be more specific, in the stage 7, a code for individually calling and executing the application program respectively corresponding to the plurality of job requests is described.

The stage 8 shows an example of an SQL stage. In the stage 8, a code for executing a commitment request (Commit) for committing the processing that has been requested up to this point to the database record is described.

The stage 9 shows an example of a program stage. In the stage 9, a code is described for executing a success processing in a case where all the processing have been successfully performed for the plurality of job requests. In the stage 9, a code for executing this success processing for all of the job requests is described.

Figure 12:
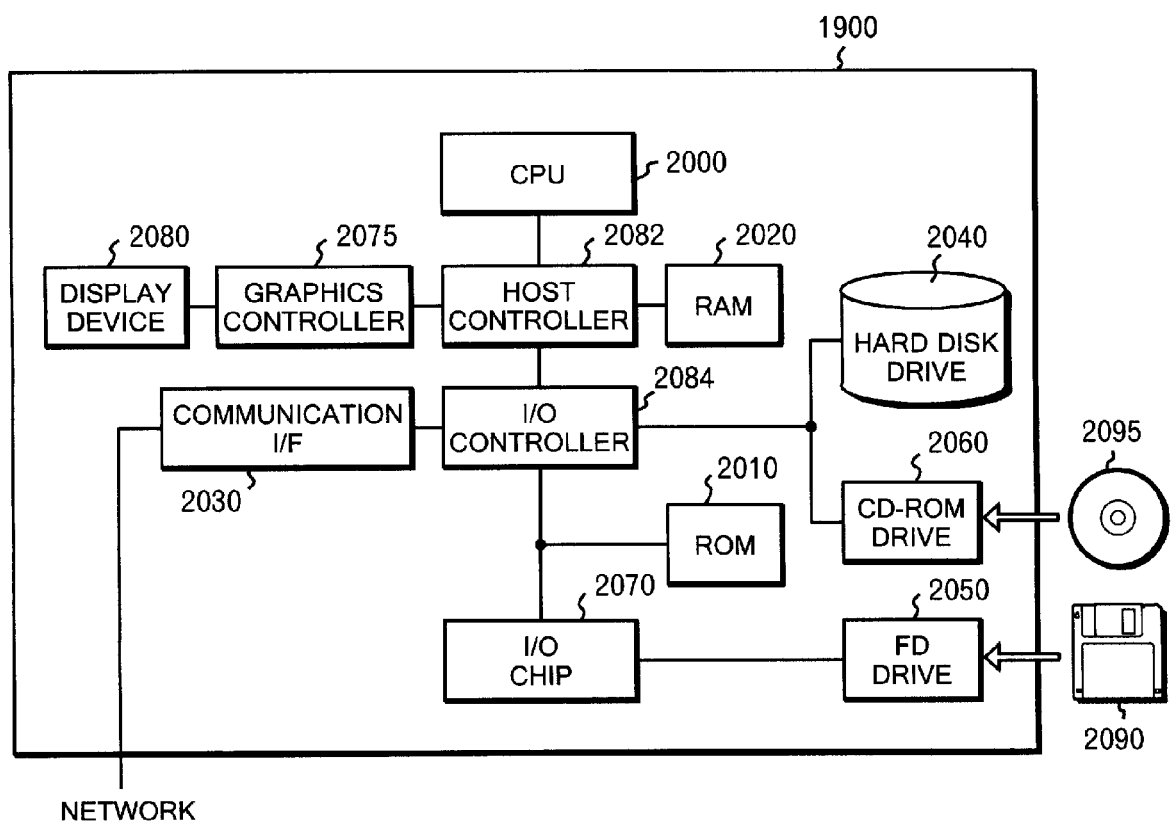
FIG. 12 shows an example of a hardware configuration of a computer 1900 according to the embodiment of the present invention.

Referring to FIG. 12, an example of a hardware configuration of a computer 1900 according to this embodiment is shown. The computer 1900 according to this embodiment includes a CPU peripheral unit, an input/output unit and a legacy input/output unit. The CPU peripheral unit includes a CPU 2000, a RAM 2020 and a graphics controller 2075, all of which are mutually connected to one another via a host controller 2082. The CPU peripheral unit also includes a display device 2080. The input/output unit includes a communication interface 2030, a hard disk drive 2040 and a CD-ROM drive 2060, all of which are connected to the host controller 2082 via an input/output controller 2084. The legacy input/output unit includes a ROM 2010, a flexible disk drive 2050 and an input/output chip 2070, all of which are connected to the input/output controller 2084.

The host controller 2082 mutually connects the RAM 2020 to the CPU 2000 and the graphics controller 2075, all of which access the RAM 2020 at a high transfer rate. The CPU 2000 operates according to a program stored in the ROM 2010 and the RAM 2020, and controls each of the components. The graphics controller 2075 obtains image data generated by the CPU 2000 or the like in a frame buffer provided in the RAM 2020, and causes the display device 2080 to display the obtained image data. In place of this, the graphics controller 2075 may internally include a frame buffer in which the image data generated by the CPU 2000 or the like is stored.

The input/output controller 2084 connects the host controller 2082 to the communication interface 2030, the hard disk drive 2040 and the CD-ROM drive 2060, all of which are relatively high-speed input/output devices. The communication interface 2030 communicates with another device via a network. The hard disk drive 2040 stores, therein, a program and data to be used by the CPU 2000 in the computer 1900. The CD-ROM drive 2060 reads a program or data from a CD-ROM 2095, and provides the read program or data to the hard disk 2040 via the RAM 2020.

In addition, the input/output controller 2084 is connected to relatively low-speed input/output devices such as the ROM 2010, the flexible disk drive 2050 and the input/output chip 2070. The ROM 2010 stores a program such as a boot program executed at a start-up time of the computer 1900 and/or a program depending on hardware of the computer 1900 or the like. The flexible disk drive 2050 reads a program or data from a flexible disk 2090, and provides the read program or data to the hard disk drive 2040 via the RAM 2020. The input/output chip 2070 connects the flexible disk drive 2050 to the input/output controller 2084 and also connects various kinds of input/output devices to the input/output controller 2084 through a parallel port, a serial port, a keyboard port, a mouse port and the like, for example.

A program to be provided to the hard disk drive 2040 via the RAM 2020 is provided by a user with a storage medium with the program stored therein, such as the flexible disk 2090 and the CD-ROM 2095 and an IC card or the like. The program is read from the storage medium, then installed in the hard disk drive 2040 in the computer 1900 via the RAM 2020 and executed by the CPU 2000.

The program to be installed on the computer 1900 and to cause the computer 1900 to function as the converter 20 is provided with an input module, an output module, a storage module, a code identification module, a variable conversion module, a mask vector processing module, a multiplexing module, a side effect detection module, a roll back insertion module, a recall insertion module, an integration processing module and an execution order change module. Such programs or modules function by use of the communication interface 2030 or the like of the computer 1900 as the input unit 32 and the output unit 36. In addition, these programs or modules cause the RAM 2020 or the like of the computer 1900 to function as the storage unit 34. Moreover, these programs or modules cause the CPU 2000 of the computer 1900 to function as the code identification unit 42, the variable converter 44, the mask vector insertion unit 46, the multiplexing unit 48, the side effect detector 50, the roll back insertion unit 52, the recall insertion unit 54, the integration processing unit 56 and the execution order change unit 58.

Information processing written in these program modules are read by the computer 1900 and thereby function as the input unit 32, the storage unit 34, the output unit 36, the code identification unit 42, the variable converter 44, the mask vector insertion unit 46, the multiplexing unit 48, the side effect detector 50, the roll back insertion unit 52, the recall insertion unit 54, the integration processing unit 56 and the execution order change unit 58, all of which are specific means resulting from cooperation of software and the aforementioned various types of hardware resources. The converter 20 specific to an intended purpose is built up by performing computation or processing for information in accordance with the intended purpose of the computer 1900 in this embodiment by use of such specific means.

In a case where communications between the computer 1900 and an external device are performed, for example, the CPU 2000 executes a communication program loaded on the RAM 2020 and instructs the communication interface 2030 on the basis of processing contents described in the communication program to perform communication processing. Upon receipt of a control signal from the CPU 2000, the communication interface 2030 reads transmission data stored in a transmission buffer region or the like provided in a storage device such as the RAM 2020, the hard disk drive 2040, the flexible disk 2090 or the CD-ROM 2095 and then transmits the data to a network or writes reception data received from the network into a receiving buffer region or the like provided on a storage device. As described above, the communication interface 2030 is allowed to transfer transmission and reception data between itself and a storage device by a direct memory access (DMA) scheme. Instead of this, the CPU 2000 is also allowed to read data from a storage device of or a communication interface 2030 of a transfer source and then to transfer transmission and reception data by writing the data into a communication interface 2030 or a storage device of a transfer destination.

In addition, the CPU 2000 causes all of, or a required portion of, data to be read from a file or a database stored in an external device such as the hard disk drive 2040, the CD-ROM 2060 (CD-ROM 2095), the flexible disk drive 2050 (flexible disk 2090) or the like into the RAM 2020 by DMA transfer or the like, and then performs various kinds of processing for the data in the RAM 2020. Then, the CPU 2000 writes the processed data back in the external storage device by DMA transfer or the like. In such processing, since the RAM 2020 can be considered as a device in which contents of an external storage device is stored temporarily, the RAM 2020 and an external storage device or the like are collectively termed as a memory, a storage unit, a storage device or the like in this embodiment. Moreover, various types of information including various types of programs, data, tables, databases and the like in this embodiment are stored in such a storage device and are handled as an information processing target. It should be noted that the CPU 2000 is allowed to retain a part of data in the RAM 2020 in a cache memory and then to read and write the data in the cache memory. In this case as well, since the cache memory partially shares the function of RAM 2020, the cache memory is considered to be included in the RAM 2020, a memory and/or a storage device except for a case where the cache memory needs to be distinguished from the RAM 2020, a memory and/or a storage device.

In addition, the CPU 2000 performs, on the data read from the RAM 2020, various types of processing being specified by a sequence of instructions of the program and including various types of computations, information processing, conditional judgment, information retrieval and replacement and the like described in this embodiment, and writes the processed data back in the RAM 2020. In a case where the CPU 2000 performs conditional judgment, for example, the CPU 2000 determines by comparing a variable with the other variable or constant whether or not each of various types of variables indicated in the present embodiment satisfies a condition whether or not the variable is larger, smaller, not less, not greater, equal or the like. In a case where the condition is satisfied (or the condition is not satisfied), the processing of the CPU 2000 branches to a different instruction sequence or calls a subroutine.

In addition, the CPU 2000 is capable of searching for information stored in a file, a database or the like in a storage device. For example, in a case where multiple entries having attribute values of a first attribute respectively associated with attribute values of a second attribute are stored in a storage memory, the CPU 2000 searches the multiple entries stored in the storage device for an entry whose attribute value of the first attribute matches a specified condition. Then, the CPU 2000 reads an attribute value of the second attribute stored in the entry, and thereby, obtains the attribute value of the second attribute that satisfies a predetermined condition and that is associated with the first attribute.

The programs or modules described above may be stored in an external storage medium. As the storage medium, any one of the following media may be used: an optical recording medium such as a DVD or a CD; a magneto-optic recording medium such as an MO; a tape medium; and a semiconductor memory such as an IC card, in addition to the flexible disk 2090 and the CD-ROM 2095. Alternatively, the program may be provided to the computer 1900 via a network, by using, as a recording medium, a storage device such as a hard disk or a RAM provided in a server system connected to a private communication network or the Internet.

The present invention has been described with reference to preferred embodiments. The technical scope of the present invention, however, is not limited to the above-described embodiments only. It will be clear to one skilled in the art that various modifications and improvements may be made to the above-described embodiments. Accordingly, such modifications and improvements are also included in the present invention as defined by the appended claims.

What is claimed is:

1. A conversion method for converting an application program to be executed for every job request into a batch processing program for collectively processing the plurality of job requests, comprising the steps of:
   Identifying as a service request code, a portion of the application program that includes a code to issue a service request to request another server to execute processing;
   Identifying as a processing code, a portion of the application program that does not include the service request code;
   converting the service request code in the application program into a collective service request code that collectively requests a plurality of services corresponding to the plurality of job requests;
   converting the processing code in the application program into a multiplexing code that multiplexes an execution of multiple processings corresponding to the plurality of job requests;
   outputting, as the batch processing program, the collective service request code and the multiplexing code; and
   inserting, into the application program, a mask vector generating code for generating a mask vector for each of multiple stages obtained by separating code sequences in the application program, where the mask vector stores, as indices of the respective job requests, values each specifying whether or not to execute the stage, wherein the outputting, as the batch processing program, includes the mask vector generating code.

2. The converter method according to claim 1, wherein if the application program includes a query for issuing a service request to a database server, converting a code for issuing the query in the application program into a single collective service request code, by collectively listing, in a single description, a plurality of queries corresponding to the plurality of job requests.

3. The converter method according to claim 1, wherein if the application program includes a query for issuing a service request to a database server, converting a code for issuing the query in the application program into a code for issuing a single combined query obtained by combining a plurality of queries corresponding to the plurality of job requests.

4. The converter method according to claim 3, wherein the code for issuing the combined query is described by a SELECT statement having, as a WHERE condition, a sum of sets of multiple WHERE conditions corresponding to the plurality of job requests, in a case where the code for issuing the query included in the application program is described by use of a SELECT statement for accessing a single database table.

5. The converter method according to claim 1, further comprising:
   detecting, as a side effect code, a code from the application program for executing processing having an influence on a processing result of any other job request; and
   inserting, into the application program before the detected side effect code, a roll back request code for issuing a roll back request to roll back processings that have been performed for all service requests issued for the plurality of job requests,
   wherein outputting, as the batch processing program, includes the roll back request code.

6. The converter method according to claim 1, wherein, if the application program includes a roll back request
   inserting, into the application program, a roll back request code for issuing a roll back request to roll back processing that has been performed for all service requests issued for the plurality of job requests, on condition that the roll back request is to be issued in accordance with any of the job requests;
   wherein outputting, as the batch processing program, includes the roll back request code.

7. The converter method according to claim 6, wherein if a roll back request code has been inserted in the application program, inserting a calling code for calling the application program in accordance with each of the plurality of job requests individually, wherein outputting wherein outputting, as the batch processing program, includes the calling code.

8. The converter method according to claim 1, further comprising:
   converting a variable in the application program into a vector variable assigned indices respectively corresponding to the plurality of job requests, wherein the application program with the converted variable is output as part of the batch processing program.

9. The converter method according to claim 1, wherein if there are a plurality of preceding stages to be executed immediately prior the stage, inserting, into the application program, a code for generating a mask vector of the stage by performing, for each of the indices, an OR operation on a plurality of mask vectors of the preceding stages, the mask vectors respectively passed over from the preceding stages.

10. A computer-readable storage medium tangibly embodying computer-executable instructions program for causing a computer to function as a converter for an application program to be executed for every job request into a batch processing program for collectively processing the plurality of job requests, wherein the instructions program when implemented, causes the computer to perform a method comprising the steps of:
   Identifying as a service request code, a portion of the application program that includes a code to issue a service request to request another server to execute processing;

Identifying as a processing code, a portion of the application program that does not include the service request code;

converting the service request code in the application program into a collective service request code that collectively requests a plurality of services corresponding to the plurality of job requests;

converting the processing code in the application program into a multiplexing code that multiplexes an execution of multiple processings corresponding to the plurality of job requests;

outputting, as the batch processing program, the collective service request code and the multiplexing code; and inserting, into the application program, a mask vector generating code for generating a mask vector for each of multiple stages obtained by separating code sequences in the application program, where the mask vector stores, as indices of the respective job requests, values each specifying whether or not to execute the stage, wherein the outputting, as the batch processing program, includes the mask vector generating code.

11. A computer-readable storage medium tangibly embodying computer-executable instructions program for causing a computer to function as a converter for an application program to be executed for every job request into a batch processing program for collectively processing the plurality of job requests, wherein the instructions program when implemented, causes the computer to perform the steps of a method comprising:

Identifying as a service request code, a portion of the application program that includes a code to issue a service request to request another server to execute processing;

Identifying as a processing code, a portion of the application program that does not include the service request code;

converting the service request code in the application program into a collective service request code that collectively requests a plurality of services corresponding to the plurality of job requests;

converting the processing code in the application program into a multiplexing code that multiplexes an execution of multiple processings corresponding to the plurality of job requests;

outputting, as the batch processing program, the collective service request code and the multiplexing code; and inserting, into the application program, a mask vector generating code for generating a mask vector for each of multiple stages obtained by separating code sequences in the application program, where the mask vector stores, as indices of the respective job requests, values each specifying whether or not to execute the stage, wherein the outputting, as the batch processing program, includes the mask vector generating code;

wherein if the application program includes a query for issuing a service request to a database server, converting a code for issuing the query in the application program into a single collective service request code, by collectively listing, in a single description, a plurality of queries corresponding to the plurality of job requests.

12. The computer-readable storage medium according to claim 11, wherein the code for issuing the combined query is described by a SELECT statement having, as a WHERE condition, a sum of sets of multiple WHERE conditions corresponding to the plurality of job requests, in a case where the code for issuing the query included in the application program is described by use of a SELECT statement for accessing a single database table.

13. The computer-readable storage medium according to claim 12, wherein the code for issuing the combined query is described by a SELECT statement having, as a WHERE condition, a sum of sets of multiple WHERE conditions corresponding to the plurality of job requests, in a case where the code for issuing the query included in the application program is described by use of a SELECT statement for accessing a single database table.

14. The computer-readable storage medium according to claim 13, further comprising:

detecting, as a side effect code, a code from the application program for executing processing having an influence on a processing result of any other job request; and inserting, into the application program before the detected side effect code, a roll back request code for issuing a roll back request to roll back processings that have been performed for all service requests issued for the plurality of job requests, wherein outputting, as the batch processing program, includes the roll back request code.

15. The computer-readable storage medium according to claim 14, wherein, if the application program includes a roll back request inserting, into the application program, a roll back request code for issuing a roll back request to roll back processing that has been performed for all service requests issued for the plurality of job requests, on condition that the roll back request is to be issued in accordance with any of the job requests;

wherein outputting, as the batch processing program, includes the roll back request code.

16. The computer-readable storage medium according to claim 15, wherein if a roll back request code has been inserted in the application program, inserting a calling code for calling the application program in accordance with each of the plurality of job requests individually, wherein outputting wherein outputting, as the batch processing program, includes the calling code.

17. The computer-readable storage medium according to claim 16, further comprising:

converting a variable in the application program into a vector variable assigned indices respectively corresponding to the plurality of job requests, wherein the application program with the converted variable is output as part of the batch processing program.

18. The computer-readable storage medium according to claim 17, wherein if there are a plurality of preceding stages to be executed immediately prior the stage, inserting, into the application program, a code for generating a mask vector of the stage by performing, for each of the indices, an OR operation on a plurality of mask vectors of the preceding stages, the mask vectors respectively passed over from the preceding stages.

* * * * *